United States Patent
Keister et al.

(10) Patent No.: US 11,661,364 B2
(45) Date of Patent: May 30, 2023

(54) COOLING WATER TREATMENT COMPOSITION FOR DECREASING ENERGY USE

(71) Applicant: ProChemTech International, Inc., Brockway, PA (US)

(72) Inventors: Timothy Keister, Brockway, PA (US); Megan Briody, DuBois, PA (US)

(73) Assignee: ProChemTech International, Inc., Brockway, PA (US)

( * ) Notice: Subject to any disclaimer, the term of this patent is extended or adjusted under 35 U.S.C. 154(b) by 225 days.

(21) Appl. No.: 17/114,902

(22) Filed: Dec. 8, 2020

(65) Prior Publication Data

US 2022/0177339 A1   Jun. 9, 2022

(51) Int. Cl.
*C02F 5/10*   (2023.01)
*C02F 1/68*   (2023.01)
*C02F 1/00*   (2023.01)
*C02F 103/02*   (2006.01)

(52) U.S. Cl.
CPC .................. *C02F 5/10* (2013.01); *C02F 1/68* (2013.01); *C02F 1/00* (2013.01); *C02F 2103/023* (2013.01); *C02F 2303/08* (2013.01); *C02F 2303/22* (2013.01); *C02F 2305/04* (2013.01)

(58) Field of Classification Search
None
See application file for complete search history.

(56) References Cited

U.S. PATENT DOCUMENTS

| | | | |
|---|---|---|---|
| 4,589,994 A | * | 5/1986 | Moseman .............. A61K 8/463 510/420 |
| 5,853,595 A | | 12/1998 | Hancock et al. |
| 8,128,841 B2 | | 3/2012 | Keister |
| 9,227,864 B2 | | 1/2016 | Keister |
| 2008/0020470 A1 | | 1/2008 | Keister |

OTHER PUBLICATIONS

EndoTherm Energy Saving Additive for Heating Systems, PACE Technical Bulletin, Association of Water Technologies, 2 pages, Vancouver, www.pacechem.com.
Common Chemistry: A CAS Solutution, CAS Registry No. 68412-54-4, CA Index Name: Poly(oxy-1,2-ethanediyl), α-(nonylphenyl)-ω-hydroxy-, branched, 1 page.
Octoxynol 9; CAS No. 68412-54-4, ChemicalBook, 2017, 3 pages.
System of Registries, US EPA; Polyethylene glycol mono(branched nonylphenyl) ether; Jun. 19, 2020, 5 pages.
Hlivka, New Chemical Method for Improving Cooling Tower Thermal Capability, Drew Industrial Division, Ashland Chemical Co., International Water Conference, Boonton, NJ, Oct. 22, 1996, 5 pages.

* cited by examiner

*Primary Examiner* — Clare M Perrin
(74) *Attorney, Agent, or Firm* — Kilyk & Bowersox, P.L.L.C.

(57) ABSTRACT

Water treatment compositions useful to decrease surface tension of cooling tower waters are provided as are treated cooling tower waters. The compositions increase the transfer of heat from metal surfaces in contact with the treated cooling water. The increased heat transfer can decrease energy use, for example, in water-cooled HVAC and refrigeration compressors, and can enable increased production rates in many industrial processes, including, for example, plastics molding, metal billet production, petroleum refining, power plants, and condensers for steam turbines. Also provided are cooling tower water compositions formulated to control corrosion, scale, and deposition in a cooling tower and in treated cooling tower water.

21 Claims, No Drawings

COOLING WATER TREATMENT COMPOSITION FOR DECREASING ENERGY USE

FIELD OF THE INVENTION

The present invention pertains to compositions for treatment of cooling tower waters to control corrosion, scale formation, and deposits. The present invention also pertains to cooling tower waters containing the compositions.

BACKGROUND OF THE INVENTION

Cooling tower water treatment compositions are known, for example, from U.S. Pat. No. 9,227,864 B2 to Keister and from U.S. Pat. No. 8,128,841 B2 to Keister. While such compositions are excellent for preventing corrosion, scale, and deposit formation, little was known about whether the compositions could increase heat transfer from metal surfaces to cooling tower water.

An apparatus known as a De Nouy Tensiometer has been used for the measurement of water surface tension. Operation of the apparatus returns a value of 72.8 dynes/cm for distilled water, matching closely with the value of 72.7 dynes/cm, at a water temperature of 20° C., reported by literature.

One product commercially available from EndoTherm, of Warrington, Cheshire, United Kingdom, is a product advertised for reducing energy use in closed hot and cold water loops. The product includes a surfactant, decyl glucoside, which functions to reduce the surface tension of treated water. Dosage of the product was reported to be 0.1% of the water volume, i.e., 1,000 mg/l. To achieve a sufficient reduction in surface tension of cooling tower water, it has been found that a high level of the surfactant needs to be added. At economically feasible levels, however, little reduction in surface tension is exhibited.

U.S. Pat. No. 5,853,595 to Hancock et al., describes the use of surfactants to increase thermal capacity of a splash-filled cooling tower. Neat surfactants are added directly to the cooling tower basin so as to obtain an increase in the thermal capacity of the cooling tower by increasing the evaporation rate. The addition results in an increase in the thermal capacity of a splash-filled evaporative cooling tower. Nothing is taught, however, about increasing heat transfer from metal surfaces into cooling tower water or about significant reductions in surface tension. Moreover, the patent does not provide an all-in-one treatment composition that is useful to prevent corrosion, scale, and deposit formation in cooling tower systems and waters.

SUMMARY OF THE INVENTION

It is an object of the present invention to increase transfer of heat into cooling water from metal surfaces.

It is an object of the present invention to obtain increased heat transfer of cooling water by reducing the surface tension of the cooling water thus enabling the cooling water to better wet a metal surface.

It is an object of the present invention to provide improved wetting of a metal surface to improve heat transfer and decrease energy use in HVAC and refrigeration chiller systems.

It is an object of the present invention to provide industries with improved heat transfer capabilities to enable increased production with no increase in energy use.

It is an object of the present invention to provide, in steam power plants, improved heat transfer in steam condensers to increase power production with no increase in energy use.

According to various embodiments of the present invention, a cooling tower water treatment composition is provided that comprises ethoxylated nonoxynol 8 and sodium xylene sulfonate. When the composition is dosed into cooling tower water at a recommended amount, the surface tension of the treated water is substantially reduced. The reduced surface tension of the treated cooling water improves wetting of metal surfaces that come in contact with the treated cooling water. The improved wetting increases transfer of heat from the metal into the treated cooling water.

It is estimated that the improved heat transfer in air conditioning and refrigeration compressors can decrease energy use by 5% to 15%. Improved transfer of heat into cooling water in many processes, such as plastic molding, metal billet production, petroleum refining, and power generation, enables increased production rates with no increase in energy use.

DETAILED DESCRIPTION

According to various embodiments, the present invention provides a water treatment composition comprising an aqueous solution of a coupling agent and an alkoxylated nonoxynol. The alkoxylated nonoxynol can comprise an ethoxylated nonoxynol, an alkoxylated nonoxynol 6-14, a combination thereof, or the like. For example, the alkoxylated nonoxynol can be ethoxylated nonoxynol 8 (EN-8). The coupling agent can comprise one or more coupling agents selected from sodium xylene sulfonate, potassium xylene sulfonate, ammonium xylene sulfonate, sodium toluene sulfonate, potassium toluene sulfonate, and ammonium toluene sulfonate. The coupling agent can comprise sodium xylene sulfonate and the alkoxylated nonoxynol can comprise ethoxylated nonoxynol 8 (EN-8). In an example, the ratio of sodium xylene sulfonate to EN-8 in the composition can be within the range of from 0.25:1 to 3.5:1. The ratio of sodium xylene sulfonate to EN-8 in the composition can be within the range of from 0.25:1 to 1.0:1.

Ethoxylated nonoxynol 8 (EN-8) is available from Solvay USA, Inc. 504 Carnegie Center, Princeton, N.J. 08540.

Alternatively, ethoxylated nonoxynol 8 (EN-8) can be synthesized by ethoxylation of nonylphenol by addition of eight moles of ethylene oxide to one mole of nonylphenol. The generic structure of this compound is shown in the following drawing. Note for EN-8 that the "n" would be 8:

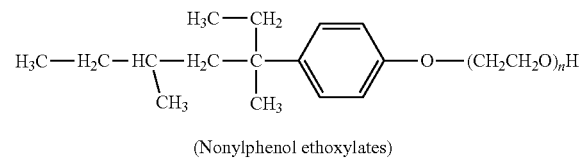

(Nonylphenol ethoxylates)

More details about ethoxylated nonoxynol 8 and other polyethylene glycol mono(branched nonylphenyl) ethers can be found in the U.S. EPA System of Registries, which is incorporated herein in its entirety by reference, using Internal Tracking Number 427393 and the substance details provided therein.

According to various embodiments, the present invention also provides a treated cooling water comprising cooling water and a water treatment composition as described herein, specifically comprising a coupling agent and an alkoxylated nonoxynol. The treated cooling water can comprise from 0.5 mg/l to 40 mg/l of alkoxylated nonoxynol, for example, from 0.5 mg/l to 40 mg/1, or from 1 mg/l to 20 mg/1, or from 5 mg/l to 15 mg/1, of alkoxylated nonoxynol, for example, ethoxylated nonoxynol 8.

In an example, ethoxylated nonoxynol 8 can be present in the treated cooling water at a concentration of from 3 mg/l to 20 mg/l. In an example, ethoxylated nonoxynol 8 is present in the treated cooling water at a concentration of from 8 mg/l to 12 mg/l.

The coupling agent can comprise a xylene sulfonate, such as sodium xylene sulfonate. In treated cooling water, the xylene sulfonate, for example, sodium xylene sulfonate, can be present at a concentration of from 0.5 mg/l to 40 mg/1, at a concentration of from 1 mg/l to 20 mg/1, at a concentration of from 5 mg/l to 15 mg/1, or at a concentration of from 8 mg/l to 12 mg/l.

In an all-in-one embodiment according to the present invention, the coupling agent is an active ingredient, the water treatment composition comprises other active ingredients, the other active ingredients comprise AMPS acrylic terpolymer, sodium silicate, a source of phosphate ions, and a source of polyphosphate ions. The coupling agent can be present in an amount of from 0.5% by weight to 15.0% by weight, from 1.0% by weight to 10.0% by weight, from 1.0% by weight to 8.0% by weight, or from 2.0% by weight to 5.0% by weight, based on the total weight of the active ingredients. The AMPS acrylic terpolymer can be present in an amount of from about 1.5% by weight to about 10.0% by weight based on the total weight of the water treatment composition. The sodium silicate can be present in an amount of from about 1.0% by weight to about 10.0% by weight based on the total weight of the composition. The water treatment composition can have a pH of about 12.0 or higher. In such a composition, the coupling agent can be sodium xylene sulfonate.

According to various embodiments, the alkoxylated nonoxynol is an active ingredient, the water treatment composition comprises other active ingredients, and the other active ingredients comprise AMPS acrylic terpolymer, sodium silicate, a source of phosphate ions, and a source of polyphosphate ions. The alkoxylated nonoxynol can be present in an amount of from 0.5% by weight to 15.0% by weight, from 1.0% by weight to 10.0% by weight, from 1.0% by weight to 8.0% by weight, from 1.0% by weight to 5.0% by weight, or from 2.0% by weight to 5.0% by weight, based on the total weight of the active ingredients. The AMPS acrylic terpolymer can be present in an amount of from about 1.5% by weight to about 10.0% by weight based on the total weight of the water treatment composition. The sodium silicate can be present in an amount of from about 1.0% by weight to about 10.0% by weight based on the total weight of the composition. The water treatment composition can have a pH of about 12.0 or higher. The alkoylated nonoxynol can comprise an ethoxylated nonoxynol 6-14, for example, ethoxylated nonoxynol 8.

According to various embodiments, the coupling agent can comprise sodium xylene sulfonate. Sodium xylene sulfonate can be an active ingredient and the water treatment composition can comprise other active ingredients. The other active ingredients can comprise phosphonobutane tricarboxylic acid (PBCT), a polyacrylic acid species (PAS), and polymaleic acid (PM). The sodium xylene sulfonate can be present in an amount of from 1.0% by weight to 5.0% by weight based on total weight of active ingredients. The weight % ratio of PBCT to PM can be from about 1:1.5 to about 1:3. The weight % ratio of PAS to PM can be from about 1:2 to about 1:4.

In some embodiments, the alkoylated nonoxynol can comprise ethoxylated nonoxynol 8. The ethoxylated nonoxynol 8 can be an active ingredient and the water treatment composition can comprise other active ingredients. The other active ingredients can comprise phosphonobutane tricarboxylic acid (PBCT), a polyacrylic acid species (PAS), and polymaleic acid (PM). The ethoxylated nonoxynol 8 can be present in an amount of from 1.0% by weight to 5.0% by weight based on the total weight of active ingredients. The weight % ratio of PBCT to PM can be from about 1:1.5 to about 1:3. The weight % ratio of PAS to PM can be from about 1:2 to about 1:4.

According to various embodiments, the surface tension-reducing cooling tower water treatment composition can comprise an aqueous solution of an ethoxylated nonoxynol (6-14) exhibiting a hydrophobic/lipophilic balance (HLB) of from 10 to 14, and a coupling agent. The coupling agent can comprise a xylene sulfonate or a toluene sulfonate. The ratio of the ethoxylated nonoxynol (6-14) to the coupling agent can be from 0.5:1 to 3.5:1 based on weight. The xylene sulfonate or a toluene sulfonate can comprise sodium xylene sulfonate and the ethoxylated nonoxynol (6-14) can comprise ethoxylated nonoxynol 8. A treated cooling tower water is also provided that comprises the cooling tower water treatment composition, present in the treated cooling tower water, at a concentration of from 20 mg/l to 1000 mg/l, for example, at a concentration of from 50 mg/l to 750 mg/1, at a concentration of from 50 mg/l to 500 mg/1, or at a concentration of from 75 mg/l to 250 mg/l.

The water treatment composition can further comprise a colorant. When mixing the components to form the composition, the colorant can be the last component added to the composition so that it can be seen whether all other ingredients have gone into solution.

According to various embodiments, the present invention takes advantage of known successful water treatment compositions and improves such compositions by including a two-part surface tension-reducing additive. The improved compositions, and cooling tower waters containing the composition, exhibit improved wettability on metal surfaces, increased heat transfer properties, and energy savings. As a result, heat transfer away from wetted metal surfaces is improved and energy savings can be realized, used for increased production, or both.

According to various embodiments, the present invention provides a surface tension-reducing additive that is compatible with and can be dissolved in corrosion-preventing compositions, including those taught in U.S. Pat. Nos. 8,128,841 B2 and 9,227,864 B2, these two patents being referred to herein as the patent literature of ProChemTech International. The surface tension-reducing additive can comprise an alkoxylated nonoxynol, for example, an ethoxylated nonoxynol. The alkoxylated nonoxynol can comprise a number of ethylene oxide moieties attached thereto, for example, from six to 14, from six to 12, from six to ten. From seven to nine, six, seven, eight, nine, ten, eleven, or twelve, ethylene oxide moieties. The number of such moieties is included in the nomenclature, for example, ethoxylated nonoxynol-8 contains eight ethylene oxide moieties. A preferred surface tension-reducing additive according to the present invention is ethoxylated nonoxynol 8 (EN-8).

The surface tension-reducing additive, for example, EN-8, can be coupled with a coupling agent to form a two-part system. Exemplary of suitable coupling agents are xylene sulfonates, including, for example, sodium xylene sulfonate, potassium xylene sulfonate, and ammonium xylene sulfonate. Other suitable coupling agents that can be used with the exthoxylated nonoxynol 6-14 component include sodium toluene sulfonate, potassium toluene sulfonate, and ammonium toluene sulfonate. Exemplary coupling agents can include xylene sulfonates and toluene sulfonates.

A colorant can be included to visibly show the presence of the treatment product and/or to make the treatment product optically detectable. The colorant can comprise, for example, Turquoise 8 GL (or NFBL), available from American Dyestuff Corporation, Clifton, N.J. The visible light-detectable colorant can be a sodium salt of quad sulphonated copper phthalocyanine. The colorant can have the chemical formula $Na_4C_{32}N_8CuO_{12}S_4$. The colorant can be manufactured by reacting commercial mono- and di-sulphonated copper phthalocyanine, CAS 1330-38-7, to add more sulfoxy groups to the phthalocyanine moiety. For example, the colorant can be produced by reacting a mono- and/or di-sulphonated copper phthalocyanine, such as commercially obtained Direct Turquoise Blue 86 (available from MacDyeChem Industries, Ahmedadad, India, with sulfonic acid. It has been determined that in the Color Index, such a product is called acid blue 249, and assigned a Color Index number of CI74220. This colorant is available in high purity powder form, although not limited thereto.

Measurement of an optical property, such as absorption, of the colorant at a visible light wavelength in treated cooling water enables the concentration of the product therein to be ascertained in real-time and on-site, for example, by using a pre-developed calibration model for a relationship between concentration and the optical property. The level of the product containing the colorant in the treated water then can be adjusted, as desired or needed, to change the concentration of the treatment product to achieve a desired level. Generally, these products can be reliably monitored and dosed to maintain a product level in treated coolant of from about 1 mg/L to about 1000 mg/L, for example, from about 5 mg/L to about 500 mg/L, although other concentrations can be desirably achieved.

Exemplary colorants and methods for optically detecting colorants and adjusting concentrations of treatment compositions, that can be used in accordance with the present invention, include the colorants, systems, and methods described in U.S. Patent Application Publication No. US 2008/0020470 A1 to Keister, which is incorporated herein in its entirety by reference.

An exemplary adjunct product that includes an alkoxylated nonoxynol, and a coupling agent, according to the present invention, and that can be fed directly into a cooling water system, is shown in Table 1 below. While the product formulation includes a colorant, a colorant does not need to be included. As with the other component tables shown herein, the list of components shows the components in the order that they can be, or were, added to a mixing tank. For example, to formulate the composition shown in Table 1 below, soft water was first added to the mixing tank, hence, "soft water" is the first listed component. Colorant, if used, can be added last so that it is easier for an operator to see whether the other components have thoroughly or completely gone into solution, i.e., dissolved.

TABLE 1

| Component | Exemplary % by weight actives | Exemplary % by weight as product | Exemplary Range of % by weight as product | Exemplary Range of % by weight as product |
|---|---|---|---|---|
| soft water | | 71.5 | 60-85 | 65-78 |
| sodium xylene sulfonate | 6.4 | 16 | 10-22 | 12-20 |
| ethoxylated nonoxynol 8 | 10 | 10 | 5-15 | 8-12 |
| blue colorant | 2.5 | 2.5 | 1-5 | 1.5-3.5 |

In the Tables shown herein, including Table 1, the "% by weight as product" column shows the % by weight the raw material product used in the formulation. The different percentages should add up to 100% by weight of the product, that is, of the whole product. Many raw materials are not 100% active, so the "% by weight actives" column shown in the Tables below, indicates the % by weight of active material in the finished product. The "% by weight actives" column is the actual % by weight of the active component in the finished product. For an exemplary raw material of sodium xylene sulfonate, the raw material contains only a % of active material. Assuming the raw material for sodium xylene sulfonate is 40% active, with the balance being water, the sodium xylene sulfonate is said to only 40% active. This if 16% by weight of the product, then there is only 6.4% by weight active sodium xylene sulfonate in the finished product.

In each case, the product mentioned in Tables below is the treatment composition, not the treated cooling water. The product is the product that is then dosed into a cooling water that is to be treated.

In an exemplary application, the product shown in Table 1 can be dosed to obtain from 25 mg/l to 200 mg/l as product in a cooling tower water, for example, from 40 mg/l to 150 mg/l as product in a cooling tower water, or from 50 mg/l to 100 mg/l as product in a cooling tower water. In an exemplary application, the product shown in Table 1 can be dosed to obtain from 2 mg/l to 20 mg/l EN-8 actives in a cooling tower water, for example, from 4 mg/l to 15 mg/l EN-8 actives in a cooling tower water, or from 5 mg/l to 10 mg/l EN-8 actives in a cooling tower water.

Exemplary compositions to which the surface tension-reducing formulations of the present invention can be added, or with which the surface tension-reducing formulations of the present invention can be also be used to treat cooling water, include the compositions described in U.S. Pat. No. 8,128,841 B2 to Keister, which is incorporated herein in its entirety by reference. In particular, the present surface tension-reducing formulations can be combined with a composition for controlling corrosion and deposition within a cooling tower. The present surface tension-reducing formulations can be combined with a composition for controlling corrosion and deposition within a cooling tower, to make a combined formulation before adding to cooling water, for example, in a cooling tower. Alternatively, or in addition, the present surface tension-reducing formulations can be added separately from a composition for controlling corrosion and deposition, to cooling water, for example, in a cooling tower.

An exemplary composition for controlling corrosion and deposition within a cooling tower, and that can be used together with the surface tension-reducing formulation, can comprise an aqueous solution of softened water, 2-acrylamido-2-methylpropyl sulfonic acid (AMPS) acrylic terpolymer, sodium silicate, phosphate, and polyphosphate. In some embodiments, the phosphate can be in the form of phosphate ions provided from phosphoric acid or from various inorganic phosphates such as monosodium phosphate, disodium phosphate, trisodium phosphate, other inorganic phosphate salts, combinations thereof, and the like. The polyphosphate can be in the form of polyphosphate ions provided from, for example, tetrapotassium pyrophosphate, sodium metaphosphate, combinations thereof, and the like. In some embodiments, the phosphate is in the form of an orthophosphate. In some embodiments, the phosphate comprises an orthophosphate and the ratio of orthophosphate to polyphosphate, measured as phosphate ions, can be, for example, from about 0.6:1 to about 1.5:1, or from about 0.8:1 to 1.1:1, or from about 0.8:1.5 to 1:1.5, or from about 1:1 to about 1.1:1.

In some embodiments, the composition for controlling corrosion and deposition within a cooling tower can comprise at least one of hydroxyethylidenediphosphonic acid, aminotrimethylene phosphonic acid, and phosphonobutane tricarboxylic acid. The composition can comprise an aqueous solution having a pH of about 12.0 or higher. In some embodiments, the composition can further comprise at least one of sodium tolytriazole, sodium mercaptobenzothiazole, zinc oxide, sodium molybdate dihydrate, sodium toluene sulfonate, sodium lauroylsarcosinate, tetramethyl-5-decyndiol, copper phthalocyanide quad sulfonate, sodium nitrate, and combinations thereof.

The surface tension-reducing formulation can be added before, during, or after the composition for controlling corrosion and deposition is added to a cooling water system. The surface tension-reducing formulation can be mixed with the composition for controlling corrosion and deposition, to form a pre-mix, and the pre-mix can then be added to a cooling water system.

According to various embodiments, a composition for controlling corrosion and deposition can be used to minimize corrosion of a cooling system to a level below generally accepted maximum corrosion rates, for example, for mild steel, yellow metal alloys, zinc and galvanized steel, and aluminum and aluminum alloys. A composition for controlling corrosion and deposition within a cooling tower can be selected that reduces or eliminates blowdown from evaporative cooling tower operation.

The present teachings also provide a method for preventing corrosion and deposition and improving heat transfer within a cooling tower. The method can reduce or eliminate blowdown from the operation of evaporative cooling towers. In some embodiments, a method can comprise (1) using softened water as makeup water for the cooling tower, (2) filtering the cooling water by a side stream filtration system, (3) adding to the cooling water a composition comprising an aqueous solution of AMPS acrylic terpolymer, sodium silicate, phosphate, and polyphosphate, (4) using a biocide to control biological growth, and (5) using a surface tension-reducing formulation to increase heat transfer between the cooling water and metal surfaces. The aqueous solution can comprise softened water. In such methods, the composition used can comprise a xylene or toluene sulfonate, an alkoxylated nonoxynol 6-14, and at least one of hydroxyethylidenediphosphonic acid, aminotrimethylene phosphonic acid, and phosphonobutane tricarboxylic acid. The pH of the aqueous solution can be about 12.0 or higher, for example, 12.2 or higher, 12.4 or higher, 12.6 or higher, or from about 12.0 to about 13.0 in some embodiments.

According to various embodiments, a combination of above steps (1) through (5) can permit the cycles of an operating cooling tower to be increased to any level desired, up to and including a maximum value where windage equals blowdown and the cooling tower can operate with no blowdown.

The present teachings further provide a process for operating an evaporative cooling water system with minimal or no blowdown. According to various embodiments, the process can comprise (i) using sodium cation exchange softening of all makeup water, (ii) using bypass filtration for removal of suspended solids from the cooling water, (iii) using a composition added to the cooling water to control corrosion and deposition within the cooling water system, (iv) using electrolytic bromine as a biocide added to the cooling water, and (v) using a surface tension-reducing formulation to increase heat transfer between the cooling water and metal surfaces.

Other exemplary compositions to which the surface tension-reducing formulations of the present invention can be added, or with which the surface tension-reducing formulations of the present invention can be also be used to treat cooling water, include the compositions described in U.S. Pat. No. 9,227,864 B2 to Keister, which is incorporated herein in its entirety by reference. In particular, the present surface tension-reducing formulations can be combined with a composition for controlling corrosion and deposition within a cooling tower while operating at increased cycles of concentration (COC). The composition for controlling corrosion and deposition can comprise an aqueous solution of water, a 2-phosphonabutane-1,2,4-tricarboxylic acid (PBCT), a polyacrylic acid species (PAS), and polymaleic acid (PM). The water can comprise softened water. The PAS can comprise polylacrylic acid (PA), or polyacrylic acid styrene sulfonate (AASA), or a combination thereof. The pH of the composition can be adjusted. The composition can comprise an aqueous solution having a pH of about 3.0 to 13.8. The pH can be adjusted by any means, for example, the pH can be adjusted by addition of potassium hydroxide to the composition. The composition can further comprise one or more additives as described herein. The surface tension-reducing formulation can be added before, during, or after the composition for controlling corrosion and deposition is added to a cooling water system. The surface tension-reducing formulation can be mixed with the composition for controlling corrosion and deposition, to form a pre-mix, and the pre-mix can then be added to a cooling water system The compositions of the present teachings can be used to minimize, or eliminate, scale and deposition in cooling towers operated with hard alkaline makeup water at increased COC. The compositions can be used to reduce blowdown from evaporative cooling tower operation by operation at increased COC.

A method for calculation of an operating COC that prevents scale and deposition within a cooling tower is also provided and the method can reduce blowdown from the operation of evaporative cooling towers. The method can comprise: calculating the operating COC by operating COC=2+ 110,000/(CaH+TA), wherein CaH is the calcium hardness of the makeup water as $CaCO_3$ in mg/L, and TA is the total alkalinity to pH 4.5 of the makeup water as $CaCO_3$ in mg/L; adding to the cooling water a composition comprising an aqueous solution of softened water, a xylene or toluene sulfonate, an alkoxylated nonoxynol 6-14, PBCT, PAS, and MA. The concentration of PBCT in the treated cooling water can be within the range of 6 to 14 mg/L. Optionally, a biocide can be used to control biological growth. Such methods can enable the COC of an operating cooling tower to be greatly increased.

The compositions can enable a method of preventing mineral scale and deposition within a cooling tower, the cooling tower containing cooling water contained therein, wherein the method comprises adding each of the core components of a sodium xylene or toluene sulfonate, an alkoxylated nonoxynol 6-14, phosphonobutane tricarboxylic acid (PBCT), a polyacrylic acid species (PAS), polymaleic acid (PM), and softened water, individually, or in any combination of admixtures, so as to maintain a level of PBCT in the treated cooling water of from about 6 mg/L to about 14 mg/L and a level of alkoxylated nonoxynol 6-14 of from 5 mg/l to 10 mg/l.

In some embodiments the present teachings provide a system comprising a cooling tower containing a cooling water composition comprising an aqueous solution of the following core components: a xylene or toluene sulfonate; an alkoxylated nonoxynol 6-14; phosphonobutane tricarboxylic acid (PBCT); a polyacrylic acid species (PAS); polymaleic acid (PM); and softened water. The aqueous solution can have a pH of from about 2.0 to about 13.7. The PBCT, PAS, and
PM can be present in a ratio of about 1:0.75:2.25.

EXAMPLES

Example 1

Fifteen surfactant samples were obtained and tested for surface tension reduction. Each was added to distilled water at a dose level of 5 mg/l of active ingredients (actives). Surface tension results ranging from 78 dynes/cm to 47.2 dynes/cm were obtained. The lowest surface tension and surprising results were obtained by adding 5 mg/l of ethoxylated nonoxynol 8 (EN-8) to distilled water.

Example 2

Experiments were carried out to formulate and incorporate EN-8 into various compositions. During the course of these experiments it was discovered that EN-8 could not be formulated into any of the compositions tested that were also disclosed in the patent literature of ProChemTech International.

Experiments were continued in an attempt to successfully introduce EN-8 into such compositions. The addition of sodium xylene sulfonate, at an approximate 1:1 actives ratio with EN-8, prior to the addition of EN-8, resulted in stable compositions.

Example 3

The following formulation was produced to be dosed into cooling tower waters at a dosage of from 200 mg/l to 400 mg/l. The formulation was first produced by continuously mixing the various components in Table 2 shown below, in the order shown, with the top component (soft water) being the first component added to a mixing tank. During mixing, the coupling agent, i.e., the sodium xylene sulfonate, was introduced prior to introducing the ethoxylated nonoxynol 8.

TABLE 2

| Component | % actives | % as product |
| --- | --- | --- |
| soft water | | 60.8 |
| PBCT phosphonate | 3.5 | 7.0 |
| polymaleic homopolymer | 7.8 | 15.6 |

TABLE 2-continued

| Component | % actives | % as product |
| --- | --- | --- |
| polyacrylic polymer | 2.6 | 4.2 |
| sodium xylene sulfonate | 2.4 | 6.1 |
| ethoxylated nonoxynol 8 | 2.5 | 2.5 |
| sodium benzotriazole | 1.0 | 2.5 |
| sodium molybdate dihydrate | 0.5 | 1.3 |

This product formulation was tested and found to reduce water surface tension to 47.2 dynes/cm at a product dose of 200 mg/l.

Example 4

The following formulation was produced to be dosed into cooling tower waters at a dosage of from 250 mg/l to 500 mg/l. The formulation was first produced by continuously mixing the various components in Table 3 shown below, in the order shown, with the top component (zinc oxide) being the first component added to a mixing tank. After addition of potassium hydroxide and water, additional components were not added until the mixture cleared, indicating that the zinc oxide had gone into solution. During mixing, the coupling agent, i.e., the sodium xylene sulfonate, was introduced prior to introducing the ethoxylated nonoxynol 8.

TABLE 3

| Component | % actives | % as product |
| --- | --- | --- |
| zinc oxide | 0.2 | 0.3 |
| potassium hydroxide 45% | | 24.0 |
| soft water | | 35.0 |
| HEDPA phosphonate | 2.5 | 4.2 |
| acrylic terpolymer | 2.5 | 5.2 |
| tetra potassium pyrophosphate | 2.2 | 3.9 |
| phosphoric acid 85% | 2.0 | 2.4 |
| sodium tolytriazole 50% | 2.0 | 4.6 |
| sodium silicate grade 40 | 3.5 | 12.0 |
| sodium xylene sulfonate | 2.6 | 6.4 |
| ethoxylated nonoxynol 8 | 2.0 | 2.0 |

This product formulation was tested and found to reduce water surface tension to 47.9 dynes/cm at a product dose of 250 mg/l.

COMPARATIVE EXAMPLES

Experiments with decyl glucoside showed that decyl glucoside cannot be formulated into any of the preferred cooling tower water treatment compositions described in the patent literature of ProChemTech International. Furthermore, the reported dose level of 1,000 mg/l decyl glucoside in treated water is not economic and is 100 to 200 times the recommended range of EN-8 dosages according to the present teachings. At an economic level of 5 mg/l in distilled water, decyl glucoside reduced the surface tension of distilled water from 72.8 dynes/cm to just 71.4 dynes/cm. By comparison, the compositions of the patent literature of ProChemTech International are typically used at levels of 100 mg/l to 500 mg/l in treated water but levels of the surface tension-reducing component EN-8 in the treated waters show great effect at only 5 mg/l.

Experiments with various compositions of the patent literature of ProChemTech International, to which surfactants such as tetra methyl 5 decyndiol, sodium toluene sulfonate, and sodium lauroylsarcosinate, had been successfully added, showed only minor decreases in treated water surface tension.

The entire contents of all references cited in this disclosure are incorporated herein in their entireties, by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether such a range is separately disclosed. Where a range of numerical values is recited herein, unless otherwise stated, the range is intended to include the endpoints thereof, and all integers and fractions within the range. It is not intended that the scope of the invention be limited to the specific values recited when defining a range.

All patents, patent applications, and publications mentioned herein are incorporated herein in their entireties, by reference, unless indicated otherwise.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A water treatment composition consisting of (1) an aqueous solution of a coupling agent and an alkoxylated nonoxynol, the coupling agent consisting of one or more coupling agents selected from sodium xylene sulfonate, potassium xylene sulfonate, ammonium xylene sulfonate, sodium toluene sulfonate, potassium toluene sulfonate, and ammonium toluene sulfonate, and optionally (2) one or more other ingredients selected from AMPS acrylic terpolymer, sodium silicate, a source of phosphate ions, a source of polyphosphate ions, phosphonobutane tricarboxylic acid (PBCT), a polyacrylic acid species (PAS), and polymaleic acid (PM).

2. The water treatment composition of claim 1, wherein the coupling agent is sodium xylene sulfonate and the alkoxylated nonoxynol is ethoxylated nonoxynol 8.

3. The water treatment composition of claim 2, wherein the ratio of sodium xylene sulfonate to ethoxylated nonoxynol 8 in the composition is within the range of from 0.25:1 to 3.5:1.

4. The water treatment composition of claim 2, wherein the ratio of sodium xylene sulfonate to ethoxylated nonoxynol 8 in the composition is within the range of from 0.25:1 to 1.0:1.

5. The water treatment composition of claim 1, wherein the optional ingredients consist of AMPS acrylic terpolymer, sodium silicate, a source of phosphate ions, and a source of polyphosphate ions.

6. The water treatment composition of claim 1, wherein the optional ingredients consist of phosphonobutane tricarboxylic acid (PBCT), a polyacrylic acid species (PAS), and polymaleic acid (PM).

7. A water treatment composition comprising an aqueous solution of a coupling agent and an alkoxylated nonoxynol, the coupling agent comprising one or more coupling agents selected from sodium xylene sulfonate, potassium xylene sulfonate, ammonium xylene sulfonate, sodium toluene sulfonate, potassium toluene sulfonate, and ammonium toluene sulfonate, wherein the water treatment composition comprises other ingredients, the other ingredients comprise AMPS acrylic terpolymer, sodium silicate, a source of phosphate ions, and a source of polyphosphate ions, and the coupling agent is present in an amount of from 1.0% by weight to 5.0% by weight based on the total weight of the coupling agent, the alkoxylated nonoxynol, and the other ingredients.

8. The water treatment composition of claim 7, wherein the AMPS acrylic terpolymer is present in an amount of from about 1.5% by weight to about 10.0% by weight based on the total weight of the water treatment composition, the sodium silicate is present in an amount of from about 1.0% by weight to about 10.0% by weight based on the total weight of the composition, and the water treatment composition has a pH of about 12.0 or higher.

9. The water treatment composition of claim 7, wherein the coupling agent comprises sodium xylene sulfonate.

10. The water treatment composition of claim 7, wherein the AMPS acrylic terpolymer is present in an amount of from about 1.5% by weight to about 10.0% by weight based on the total weight of the water treatment composition, the sodium silicate is present in an amount of from about 1.0% by weight to about 10.0% by weight based on the total weight of the composition, the water treatment composition has a pH of about 12.0 or higher, and the alkoylated nonoxynol comprises ethoxylated nonoxynol 8.

11. A water treatment composition comprising an aqueous solution of a coupling agent and an alkoxylated nonoxynol, the coupling agent comprising one or more coupling agents selected from sodium xylene sulfonate, potassium xylene sulfonate, ammonium xylene sulfonate, sodium toluene sulfonate, potassium toluene sulfonate, and ammonium toluene sulfonate, wherein the coupling agent comprises sodium xylene sulfonate, the water treatment composition comprises other ingredients, the other ingredients comprise phosphonobutane tricarboxylic acid (PBCT), a polyacrylic acid species (PAS), and polymaleic acid (PM), and the sodium xylene sulfonate is present in an amount of from 1.0% by weight to 5.0% by weight based on the total weight of the sodium xylene sulfonate and the other ingredients.

12. The water treatment composition of claim 11, wherein the weight % ratio of PBCT to PM is from about 1:1.5 to about 1:3, and the weight % ratio of PAS to PM is from about 1:2 to about 1:4.

13. A water treatment composition comprising an aqueous solution of a coupling agent and an alkoxylated nonoxynol, the coupling agent comprising one or more coupling agents selected from sodium xylene sulfonate, potassium xylene sulfonate, ammonium xylene sulfonate, sodium toluene sulfonate, potassium toluene sulfonate, and ammonium toluene sulfonate, wherein the alkoylated nonoxynol comprises ethoxylated nonoxynol 8, the water treatment composition comprises other ingredients, the other ingredients comprise phosphonobutane tricarboxylic acid (PBCT), a polyacrylic acid species (PAS), and polymaleic acid (PM), and the ethoxylated nonoxynol 8 is present in an amount of from 1.0% by weight to 5.0% by weight based on the total weight of the ethoxylated nonoxynol 8 and the other ingredients.

14. The water treatment composition of claim 13, wherein the weight % ratio of PBCT to PM is from about 1:1.5 to about 1:3, and the weight % ratio of PAS to PM is from about 1:2 to about 1:4.

15. A cooling tower water treatment composition consisting of (1) an aqueous solution of an ethoxylated nonoxynol (6-14) surfactant exhibiting a hydrophobic/lipophilic balance (HLB) of from 10 to 14, and a coupling agent, the coupling agent comprising a xylene sulfonate or a toluene sulfonate, wherein the ratio of the ethoxylated nonoxynol (6-14) surfactant to the coupling agent is from 0.5:1 to 3.5:1 based on weight, and optionally (2), one or more other ingredients selected from the group consisting of AMPS acrylic terpolymer, sodium silicate, a source of phosphate ions, a source of polyphosphate ions, phosphonobutane tricarboxylic acid (PBCT), a polyacrylic acid species (PAS), and polymaleic acid (PM).

16. A treated cooling tower water in a cooling water system, comprising a cooling tower water treatment composition present in the treated cooling tower water at a concentration of from 50 mg/l to 500 mg/l, wherein the cooling tower water treatment composition consists of (1) an aqueous solution of an ethoxylated nonoxynol (6-14) surfactant exhibiting a hydrophobic/lipophilic balance (HLB) of from 10 to 14, and a coupling agent consisting of sodium xylene sulfonate, wherein the ratio of the ethoxylated nonoxynol (6-14) surfactant to the coupling agent is from 0.5:1 to 3.5:1 based on weight, and optionally (2), one or more other ingredients selected from the group consisting of AMPS acrylic terpolymer, sodium silicate, a source of phosphate ions, a source of polyphosphate ions, phosphonobutane tricarboxylic acid (PBCT), a polyacrylic acid species (PAS), and polymaleic acid (PM).

17. A cooling tower comprising a cooling water system and a treated cooling tower water in the cooling water system, the treated cooling tower water comprising cooling tower water and a water treatment composition, the water treatment composition comprising an aqueous solution of a coupling agent and an alkoxylated nonoxynol, the coupling agent comprising one or more coupling agents selected from sodium xylene sulfonate, potassium xylene sulfonate, ammonium xylene sulfonate, sodium toluene sulfonate, potassium toluene sulfonate, and ammonium toluene sulfonate.

18. The cooling tower of claim 17, wherein the alkoxylated nonoxynol is ethoxylated nonoxynol 8 and the treated cooling water comprises from 1 mg/l to 20 mg/l of the ethoxylated nonoxynol 8.

19. The cooling tower of claim 17, wherein the alkoxylated nonoxynol is ethoxylated nonoxynol 8 and the ethoxylated nonoxynol 8 is present in the cooling water at a concentration of from 3 mg/l to 20 mg/l.

20. The cooling tower of claim 17, wherein the alkoxylated nonoxynol is ethoxylated nonoxynol 8 and the ethoxylated nonoxynol 8 is present in the cooling water at a concentration of from 5 mg/l to 15 mg/l.

21. The cooling tower of claim 17, wherein the coupling agent is sodium xylene sulfonate and the sodium xylene sulfonate is present in the cooling water at a concentration of from 1 mg/l to 20 mg/l.

* * * * *